Patented July 3, 1934

1,965,556

UNITED STATES PATENT OFFICE 1,965,556

METHOD FOR THE PREPARATION OF ACID HALIDES

Lindley E. Mills, Midland, Mich., assignor to The Dow Chemical Company, Midland, Mich., a corporation of Michigan No Drawing. Application March 6, 1930, Serial No. 433,822

5 Claims. (Cl. 260—123)

The present invention concerns the preparation of acid halides and relates particularly to methods for the preparation thereof involving the acidolysis of sidechain-trihalogenated toluene or equivalent thereof, such as benzotrichloride.

The reactivity of the sidechain halogen atoms in halogenated toluene towards substances such as water, acids, alcohols, esters, phenols, and amines, has long been known. Various workers have reacted benzotrichloride with acetic acid in the presence of metal compounds such as metal chlorides, whereby mixtures, which included acid anhydrides, mixed acid anhydrides, and acid chlorides, were usually obtained, such complex mixtures being difficult to separate into the components thereof. In a prior application, Serial No. 364,697, filed May 20, 1929, Patent No. 1,921,767, I have described a method for the joint synthesis of a benzoyl halide and another acid halide corresponding to the acid employed, whereby the reaction products are easily separated from each other and obtained in good yields. I have now found that similar reactions may be carried out in the presence of a small amount of a strong acid as a catalyst, the presence of a metal impurity in the product thus being avoided. My improved method may be represented by the following equation:—

I. $RCX_3 + R'COOH \rightarrow RCOX + R'COX + HX$

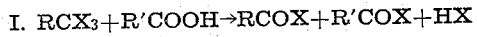

wherein R denotes an aromatic residue, R' either an alkyl, aryl, or aralkyl residue, and X represents a halogen. A more specific case is shown in the equation:—

II. $C_6H_5.CCl_3 + CH_3COOH \rightarrow C_6H_5.COCl + CH_3COCl + HCl$

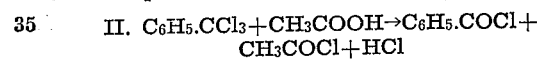

according to which, two acid chlorides, i. e. benzoyl chloride and acetyl chloride, may be obtained by reacting benzotrichloride with acetic acid. Further, the following equation:—

III. $2C_6H_5.CCl_3 + CH_3COOH + H_2O \rightarrow 2C_6H_5COCl + CH_3COCl + 3HCl$

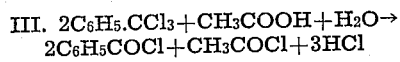

illustrates a specific case wherein water enters into the reaction.

My invention, then, consists of the procedure hereinafter fully described and particularly pointed out in the claims, the following description setting forth but a few of the various ways in which the principle of my invention may be used.

By way of illustration, my present invention will be described as relating to reacting benzotrichloride with acetic acid at a suitable temperature and under the influence of certain catalysts, such as strong mineral acids, e. g. sulphuric acid, perchloric acid, or phosphoric acid. The catalysts may be used singly or in combination of two or more thereof. The reaction is preferably carried out in such a manner that benzotrichloride is in excess of the acetic acid in the reaction mixture during the addition of the reactants. For instance, acetic acid is added slowly to benzotrichloride in the presence of a suitable catalyst. Acetyl chloride and evolved hydrochloric acid pass out of the apparatus as gases during the reaction and are recovered by any suitable means. The residual mixture is then fractionally distilled to purify the benzoyl chloride and separate acetyl chloride remaining therein.

The following examples illustrate various ways in which my invention may be operated.

Example 1

A solution of 1 mole acetic acid in 1 mole water was added over a period of two hours to 2 moles benzotrichloride containing 1 gram concentrated sulphuric acid and at a temperature of 100 to 110° C. The evolved gases, including hydrochloric acid and acetyl chloride, were passed through a condenser to separate the major portion of the latter from the former, and the hydrochloric acid gas then absorbed in water. The residual reaction mixture was then fractionally distilled, acetyl chloride and benzoyl chloride being separately collected. The total yield of acetyl chloride was 80 per cent. based on the acetic acid used. The benzoyl chloride was obtaned in a yield of 84 per cent. based on the benzotrichloride used. A small residue of benzoic acid remained in the still, corresponding to about one-tenth the amount of benzoyl chloride originally present.

Example 2

2 moles benzotrichloride including 2 grams concentrated sulphuric acid was warmed to 90° C., and 2 moles glacial acetic acid added thereto during a period of 2.5 hours. The reaction mixture was then fractionally distilled, the evolved hydrochloric acid being absorbed in water. The yield of benzoyl chloride, acetyl chloride, and hydrochloric acid, amounted to 96 per cent., 92.5 per cent., and 86 per cent., respectively.

Example 3

In a similar manner, 1.5 moles of acetic acid was reacted over a period of two hours with 1.5 moles of benzotrichloride in the presence of 1 gram of 60 per cent. perchloric acid, the reaction mixture being maintained at a temperature of about 90 to 100° C. The benzoyl chloride, acetyl chloride and hydrochloric acid, were obtained in 94 per cent., 90 per cent., and 93 per cent. yields, respectively, a residue of 0.09 mole benzoic acid remaining in the distilling flask.

*Example 4*

As in the above examples, 0.46 mole dichloracetic acid was reacted over a period of two hours with 0.46 mole of parachlorobenzotrichloride in the presence of 1 gram concentrated sulphuric acid at a temperature of about 50° C. Chlorobenzoylchloride and dichloroacetylchloride were obtained in yields of 91 per cent. and 88 per cent., respectively.

The method may be carried out in the presence of a certain amount of water provided there is an insufficient amount of the latter present to prevent the formation and separation of the desired acid chlorides. In such case, the water as well as the organic acid enters into the reaction, thus forming lesser amounts of acid halides and increased amounts of free acids, that is, the acid halides react further with the water to form the corresponding acids. For instance, water in excess of the amount shown in Equation III, will react with the acetyl chloride to form additional acetic and hydrochloric acids. The acetic acid can then react with the benzoyl chloride to form a mixed anhydride and hydrochloric acid, or benzoic acid and acetyl chloride, which latter can then further react with water, if present, to form additional acetic acid and hydrochloric acid.

As catalyst for the present method, a salt of the abovementioned mineral acids, e.g. sodium hydrogen sulfate, may be used; however, I prefer to use a mineral acid for such purpose.

I do not limit my invention to the use of the components mentioned in the examples, for instance, other organc acids which form volatile acid halides, e.g. an aliphatic acid such as propionic or butyric acids, or a halo-derivative thereof, such as chloropropionic acid, may be employed. Organic acids, e.g. benzoic acid, whose corresponding acid halides are not appreciably volatile at moderate temperatures may also be employed, but in such case the produced acid halides require other suitable separation such as by fractional distillation thereof at increased temperature and reduced pressure. Benzotrichloride may be replaced by an equivalent substituted derivative thereof, provided the substituent group or groups are substantially unaffected during the reaction, e.g. the various halo-benzotrihalides.

Other modes of applying the principle of my invention may be employed instead of the ones explained, change being made as regards the method herein disclosed, provided the details stated by any of the following claims or the equivalent of such be employed.

I therefore particularly point out and distinctly claim as my invention:—

1. The method of making a benzoyl halide and another acyl halide conjointly which comprises reacting a benzo-trihalide with an organic carboxylic acid of the formula R.COOH, wherein R represents a phenyl group or an alkyl group from the lower aliphatic series, in the presence of an acid catalyst of the group consisting of sulphuric acid, phosphoric acid, and perchloric acid.

2. The method of making benzoyl chloride and another acyl chloride conjointly which comprises reacting benzo-trichloride with an organic carboxylic acid of the formula R.COOH, wherein R represents a phenyl group or an alkyl group from the lower aliphatic series, in the presence of an acid catalyst of the group consisting of sulphuric acid, phosphoric acid, and perchloric acid.

3. The method of making benzoyl chloride and acetyl chloride which comprises reacting benzo-trichloride with acetic acid in the presence of an acid catalyst of the group consisting of sulphuric acid, phosphoric acid, and perchloric acid.

4. The method of making benzoyl chloride and another acyl chloride conjointly which comprises gradually adding an organic carboxylic acid to a body of benzo-trichloride maintained at a reaction temperature below 150° C. in the presence of an acid catalyst of the group consisting of sulphuric acid, phosphoric acid, and perchloric acid, the total amount of organic acid added not exceeding an equimolecular proportion to the benzo-trichloride employed.

5. The method of making benzoyl chloride and acetyl chloride conjointly which comprises gradually adding acetic acid to a body of benzo-trichloride maintained at a reaction temperature below 150° C. in the presence of an acid catalyst of the group consisting of sulphuric acid, phosphoric acid, and perchloric acid, the total amount of acetic acid added not exceeding an equimolecular proportion to the benzo-trichloride employed.

LINDLEY E. MILLS.